United States Patent [19]

Berglund

[11] 4,040,685
[45] Aug. 9, 1977

[54] MEASURING APPARATUS

[75] Inventor: Sture Berglund, Tyreso, Sweden

[73] Assignee: Alfredeen Production AB, Bandhagen, Sweden

[21] Appl. No.: 672,008

[22] Filed: Mar. 30, 1976

[30] Foreign Application Priority Data

Apr. 3, 1975 Sweden .............................. 7503837

[51] Int. Cl.² ............................................. F16C 19/14
[52] U.S. Cl. .................................. 308/189 R; 308/236
[58] Field of Search ............... 308/189 R, 189 A, 193, 308/205, 188, 236

[56] References Cited

U.S. PATENT DOCUMENTS

| 3,510,184 | 5/1970 | Gruber et al. | 308/189 |
|---|---|---|---|
| 3,799,635 | 3/1974 | Worrix | 308/189 |
| 3,955,861 | 5/1976 | Orain | 308/189 R |

Primary Examiner—Joseph F. Peters, Jr.
Assistant Examiner—Gene A. Church
Attorney, Agent, or Firm—Hammond & Littell

[57] ABSTRACT

There is provided a bearing assembly by means of which movement, even minute movement, can be transmitted from an object being measured to a measuring apparatus. The assembly comprises a rotatable shaft on which are mounted two inner rings and two outer rings which are displaceable relative to each other. Arranged around both sets of rings is an externally threaded sleeve. Located between respective outer and inner rings are pressure-mediating means. The rings are held between two end plates which cooperate with screw means in manner such as to change the position of the pressure-mediating means in relation to the rotatable shaft.

The shaft is provided with means for attaching a measuring arm of a measuring apparatus incorporating a measurement indicator, so that movement of the arm is transmitted through the assembly to the indicator.

The advantage afforded by such an assembly is that, when used in conjunction with the measuring apparatus, the movement of the arm is recorded accurately and positively by the measuring instrument.

6 Claims, 6 Drawing Figures

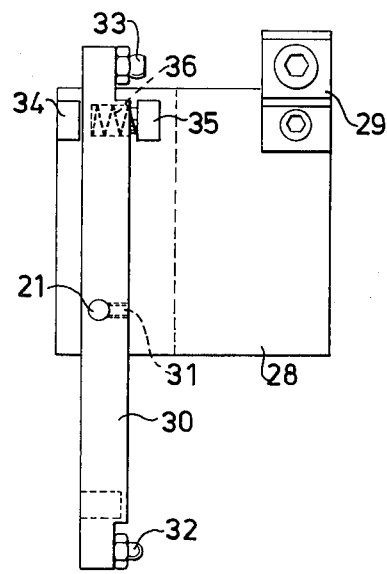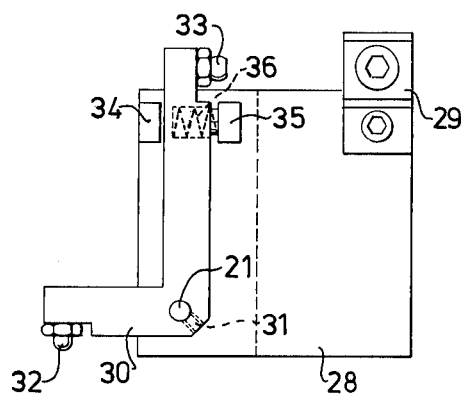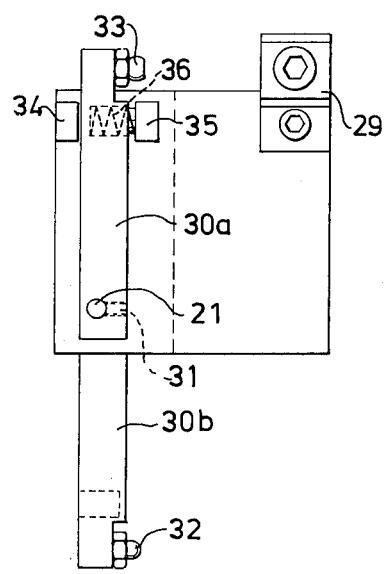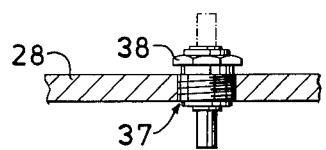

MEASURING APPARATUS

The present invention relates to measuring apparatus and particularly to a bearing assembly forming part of such apparatus and being adapted to transmit small or minute movements from a measured object to an indicator, such as a measurement indicator. The bearing assembly comprises a rotable shaft, at least two bearing means arranged on said shaft, each of said bearing means comprising an inner ring and pressure-distributing means which are arranged in cupped recesses between the rings and which permitting relative movement therebetween.

The manufacture of such bearing assemblies requires a high degree of precision, and the assembly of such a unit requires the greatest accuracy.

The bearing assembly requires the provision of especially designed assembly fixtures, tools and tension-indicating instruments if a constant play-free transmission of the small or minute angular movements of the bearing assembly is to be obtained. Despite the accuracy and precision with which the bearing assembly may have been manufactured, it is difficult in practice when mounting the bearing assembly, to obtain a constant play-free transmission of movement to the bearing shaft, which movement shall be transmitted to at least one movement-transmission arm which actuates an indicating device, either directly or indirectly.

The majority of these disadvantages can be avoided by providing a bearing assembly comprising a system of modules, which reduces the mounting work to placing module bearing assemblies in their respective positions. Further, the manufacture of bearing assemblies in accordance with the module system can be made possible by centralizing the manufacturing stage, in which high-precision work can be carried out using advanced technical equipment when assembling together the separate elements of the bearing assembly.

Bearing assemblies which permit play-free transmission of the minute angular movements for a short period of time, have been proposed, these bearing assemblies comprise cross-laid leaf springs, the purpose of which is to create a center for the rotary movement of the bearing shaft. This center, however, moves within the limits of the tolerance ranges of the leaf springs and gives rise to an unreliable measuring procedure. A certain amount of play also arises as the material from which the bearing is made ages, and in the event of measuring large movements, the leaf springs are liable to fracture as a result of fatigue. Despite this unsure outcome, the assembly of such a bearing unit is extremely time-consuming and must be effected with extreme precision.

An object of the invention is to provide a bearing assembly which eliminates at least some of the aforementioned disadvantages, the bearing assembly, being characterized in that bearing means are arranged, by press-fitting, within a sleeve provided with external screw threads, and in that between the sleeve and the outer ring of each bearing means there is provided a movement-limiting abutment surface for determining the axial position of the bearing means within the sleeve, and in that said bearing means have means for providing a variable tension effect between the inner rings or outer rings of the bearing devices.

Such a bearing assembly greatly facilitates the procedure of mounting a measuring device, the threaded portion of the outer sleeve being caused to co-act with a threaded hole pre-made in a base plate or the like of a measuring apparatus. As a result of the construction of the bearing assembly there is obtained a play-free transmission of small angular movements of the bearing shaft through the means for providing said variable tension effect between the inner rings or between the outer rings of the bearing devices, i.e. that said tension effect makes it possible to define a fixed centre around which the bearing shaft rotates. Last, but not least, there is provided means whereby large or small, complicated or less complicated, measuring assemblies can be readily constructed for different purposes.

For the purpose of the fixing the bearing means axially in the sleeve provided with external screw threads, the respective outer rings of the bearing means are provided with an annular flange which is arranged to bear against the upper side surface of the sleeve.

In accordance with one embodiment, the shaft of the bearing assembly is able to project in one direction only, and for the purpose of obtaining a tension effect between the inner rings of the bearing means, it is proposed that one end of the shaft is provided with an axial bore provided with internal screw threads and is adapted to accomodate a screw which can be actuated from without and which engages the inner ring of only one bearing device, the inner ring of the other bearing device being arranged to cooperate with an abutment surface such, that the influence exerted by the screw causes the inner rings of respective bearing means to be displaced axially relative to the two outer rings of said bearing means.

As will readily be perceived, the two outer rings of the bearing unit can be arranged to be displaced relative to the inner rings, instead.

The shaft of the bearing unit may also be made to project in both directions, at least one end of the bearing shaft being provided with a plate which, under the action of a spring, urges against the upper side surface of an inner ring with a predetermined force.

The bearing unit of the invention is used so that its outer sleeve is screwed into a threaded hole arranged, for example, in a base body, and so that the shaft of the bearing unit is arranged to co-operate with one end of at least one movement-transmitting arm, the other end of which actuates, directly or indirectly, an indicator, which may be of a type known per se.

The movement-transmitting arm may be straight and/or angular.

So that the invention will be more readily understood and further feature thereof made apparent, embodiments of the invention will now be described with reference to the accompanying drawings, in which.

FIGS. 3, and 4 and 5 show diagrammatically different forms of measuring apparatus incorporating a bearing assembly according to the invention; and FIG. 6 shows diagrammatically a bearing assembly mounted in the base plate of such an apparatus.

Figure 1:
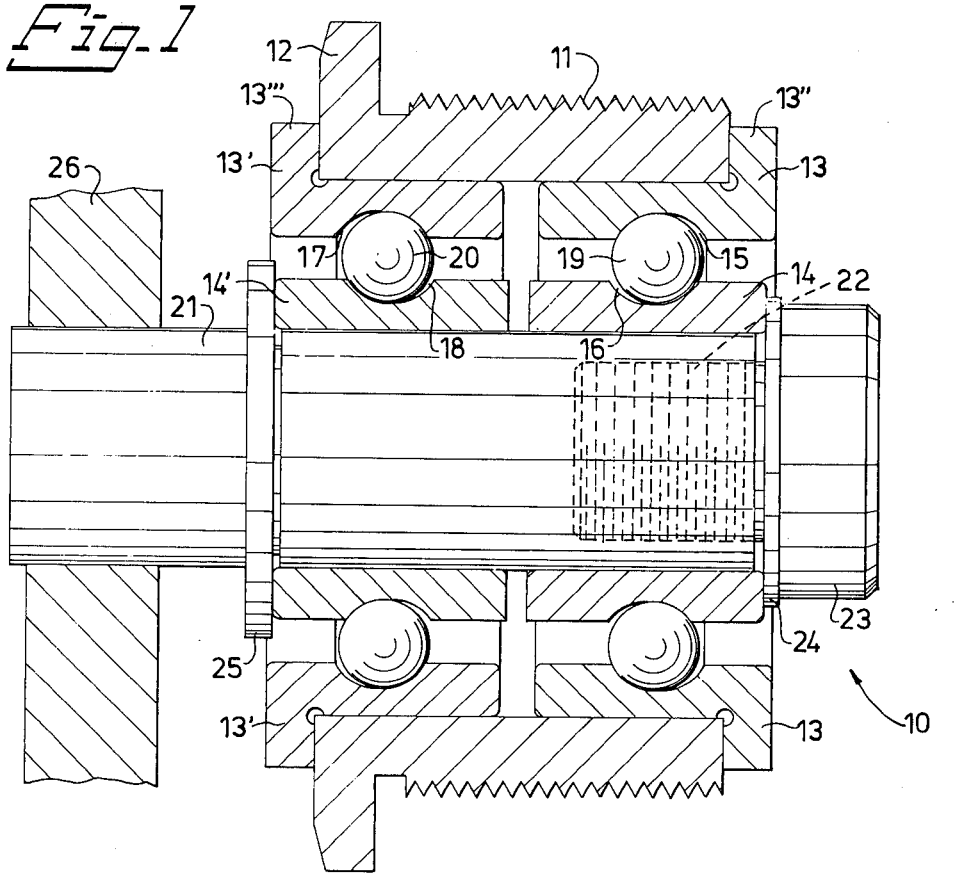
FIG. 1 is a diagrammatic, vertical sectional view of a first embodiment of a bearing assembly according to the invention, in enlarged scale.

The bearing assembly shown in FIG. 1 is referenced 10 and comprises a sleeve 12 which is provided with external screw threads 11. Press-fitted into the sleeve 12 are at least two bearing means, each comprising an outer ring 13 and 13' respectively, and an inner ring 14, 14' respectively, said inner rings being arranged to cooperate with said outer rings, and a number of pressure-distributing means, such as balls 19, 20, arranged in cupped recesses 15, 16, 17, 18 in respective bearing means. The cupped recesses 15, 16, 17, 18 are slightly larger than the diameter of the balls 19, 20 as shown in the drawing. The rings 13, 14 and 13', 14' are movable relative to each other in a known manner. With the embodiment shown in FIG. 1, there is provided a bearing shaft 21, on which the bearing means 13, 14 and 13', 14' are press-fitted, the shaft 21 extending outwardly from the bearing unit in one direction only. The outer rings 13,13' have a flange portion 13" and 13". The sleeve 12 is arranged between these flanges, which from abutment surfaces for said sleeve. One end of the shaft 21 is provided with an axial bore into which a screw 23 can be screwed. The screw 23 is provided with or is formed integrally with a plate 24, which abuts solely against the inner ring 14 of the bearing unit 13, 14, 19. The inner ring 14' of the other bearing device 13', 14', 20 is provided with a plate 25. When tightening the screw 23, the inner ring 14 will be displaced axially relative to the outer ring 13, and in the same manner the inner ring 14' will be displaced axially relative its outer ring 13'. As a result of this axial displacement, the balls 19, 20 will move from one position in the cupped recesses 15, 16 and 17, 18 and will beforced to adopt another slightly displaced position, in which latter position of the balls, upon actuation of the shaft 21, said axial movement is transmitted, with no play, to a measuring device through at least one movement-transmitting arm 26 combined with the bearing shaft 21.

As will be understood from the foregoing, the bearing assembly is particularly simple to assemble.

Figure 2:
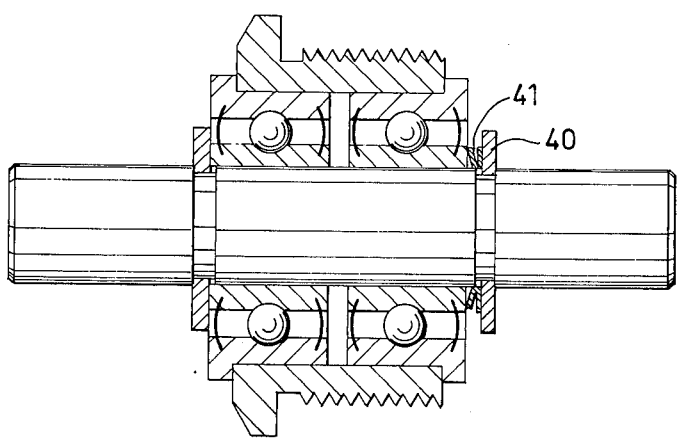
FIG. 2 is a diagrammatic vertical sectional view of a second embodiment of a bearing assembly according to the invention in enlarged scale.

The bearing assembly 27 in the embodiment of FIG. 2 differs from that in FIG. 1 only by the fact that the bearing shaft 21 projects outwardly in both directions. With the embodiment of FIG. 2, there is used to provide a fixed center for the shaft 21, i.e. similar to the bearing unit 10 in FIG. 1, to obtain a playfree transmission of shaft movement, a plate 40 which under the action of a spring 41 bears on the inner ring 14 at a determined force. This force, similar to the force exerted by the screw 23 in FIG. 1, is determined upon the manufacture of the bearing assembly through a predetermined torque.

The bearing assemblies shown in FIGS. 1 and 2 can be used in conjunction with measuring equipment of the type shown, for example, in FIGS. 3, 4 and 5, in which a baseplate 28 is provided with a holder 29 for a measurement indicator. A movement-transmission arm 30 in FIGS. 3 and 4, and 30a, 30b in FIG. 5, is pivotally mounted to the baseplate 28 by means of the bearing shaft 21 of the bearing assembly shown in FIG. 1 and 2. The shaft 21 is inserted in a hole in the arm 30 and the arm is locked to the shaft 21 by means of a locking screw 31. One end of the arm 30 is provided with a contact member, such as boss, 32, intended to contact an object to be measured so as to transfer movements of said object to said end of the arm 30. These movements are transmitted by the arm, either directly or indirectly, to the indicating device (not shown) through the intermediary of a member 33 on the other end of the arm. The movement of this last-mentioned end of the arm 30 is limited in one direction of movement by a stop member 34 and in the opposite direction of movement by a stop member 35. A pressure spring 36 acting between the stop member 35 and the arm 30 holds the arm against the stop member 34.

In the embodiment shown in FIG. 3, the movement-transmitting arm 30 is straight and is arranged above the baseplate 28, in FIG. 4 the arm is angular and is located above said baseplate 38, whilst in FIG. 5 one half 30a of the arm is located above the baseplate 28 and the other half 30b of the arm is located beneath said plate. The angled arm in FIG. 4 can also be divided into an upper arm portion and a lower arm portion. Both the straight arm of the FIG. 3 embodiment and the angled arm of the FIG. 4 embodiment can be placed in their entirety beneath the baseplate. The arrangement of the arm and the baseplate can also be in mirror-image to that shown.

The bearing assemblies shown in FIG. 1 and 2 for the movement-transmitting arms 30 are intended to be screwed into a threaded hole 37 in the baseplate 28 (FIG. 6) and the sleeve of the bearing unit provided with external threads should be provided with an abutment portion 38.

It will be understood that all positional terms, such as "above", "beneath" etc., refer to the position of the respective elements shown in the drawings, or when the assembly or measuring apparatus with which it is associated, is in its position of use.

I claim:

1. A bearing assembly which is effective to transmit small movements from a measured object to a measuring device, said assembly comprising a rotatable shaft, and at least two bearing means arranged on said shaft, each bearing means comprising an outer ring and an inner ring and pressure-distributing means arranged between the rings and permitting relative movement thereof, the bearing means being arranged within a sleeve having an external screw thread, and limiting abutment surfaces for fixing the axial position of the bearing means in the sleeve arranged between the sleeve and the outer ring of each bearing means, and wherein said bearing means have means for providing a variable tension effect between the respective inner rings of the bearing devices, one end of the shaft being provided with an axial bore having an internal screw thread which is intended to accommodate a screw which can be actuated from outside and which engages only the inner ring of one bearing means, the inner ring of the other bearing means being arranged to co-act with an abutment surface in a manner such that actuation of the screw causes respective inner rings of the bearing means to be moved axially relative to the two outer rings of the bearing devices, and such as to provide a tensioning effect between the screw and the abutment surfaces.

2. A bearing assembly according to claim 1, wherein the respective outer rings of the bearing devices are provided with an annular flange which engages the upper surfaces of the sleeve.

3. A bearing assembly according to claim 1, wherein the sleeve is arranged to be screwed into a hole arranged in a base body of a measuring apparatus, and the shaft of the bearing unit is arranged to cooperate with one end of at least one movement-transmission arm, the other end of which actuates an indicating device 4. A bearing assembly according to claim 3, wherein the movement-transmission arm is straight.

5. A bearing assembly according to claim 3, wherein the movement-transmission arm is angled.

6. A bearing assembly which is effective to transmit small movements from a measured object to a measuring device, said assembly comprising a rotatable shaft, and at least two bearing means arranged on said shaft, each bearing means comprising an outer ring and an inner ring and pressure-distributing means arranged between the rings and permitting relative movement thereof, the bearing means being arranged within a sleeve having an external screw thread, and limiting abutment surfaces for fixing the axial position of the bearing means in the sleeve arranged between the sleeve and the outer ring of each bearing means, and wherein said bearing means have means for providing a variable tension effect between the respective inner rings of the bearing devices, one end of the shaft being provided with a plate which, through the intermediary of a spring, bears against the upper side surface of an inner ring of one bearing means at a predetermined pressure, the inner ring of the other bearing means being arranged to co-act with an abutment surface in a manner such that actuation of the predetermined pressure causes respective inner rings of the bearing means to be moved axially relative to the two outer rings of the bearing device, and such as to provide a tensioning effect between the plate and the abutment surface.

* * * * *